Nov. 20, 1962     S. SCHNELL     3,064,431
POWER HYDRAULIC BOOSTER VALVE
Filed July 14, 1958
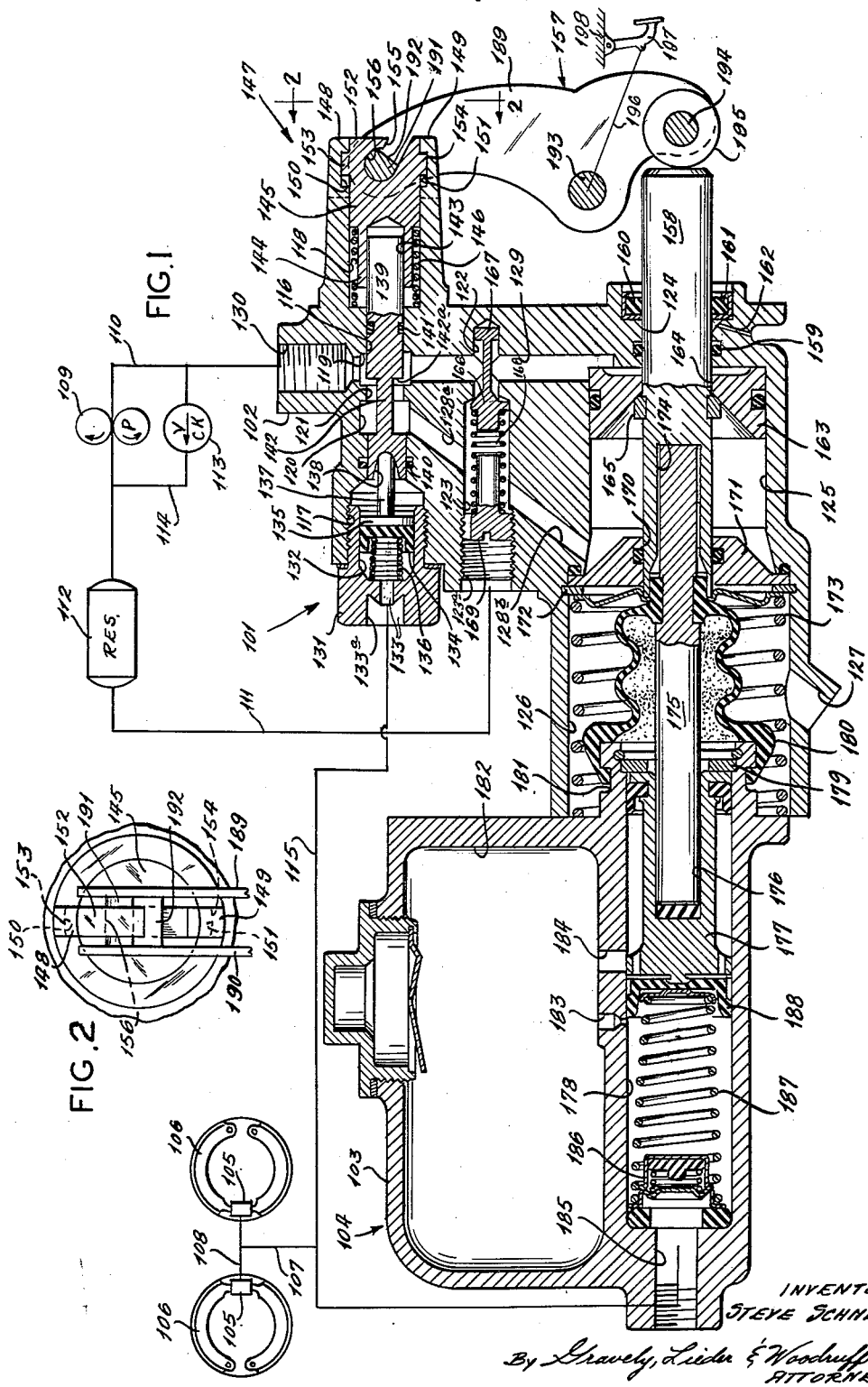
INVENTOR:
STEVE SCHNELL
By Gravely, Lieder & Woodruff
ATTORNEYS.

United States Patent Office 3,064,431
Patented Nov. 20, 1962

3,064,431
POWER HYDRAULIC BOOSTER VALVE
Steve Schnell, St. Louis, Mo., assignor to Wagner Electric Corporation, St. Louis, Mo., a corporation of Delaware
Filed July 14, 1958, Ser. No. 748,317
4 Claims. (Cl. 60—54.6)

This invention relates to power braking systems and in particular to a booster device for use therein in combination with a master cylinder.

In the past when a standard manual braking system on a vehicle was converted to a power braking system, the standard master cylinder was replaced by a unitary servo motor. The primary objection to this conversion was the cost involved in discarding the standard master cylinder and replacing it with the abovementioned unitary servo motor. Another objection was the inconvenience of mounting the unitary servo motor in proper relationship with the brake pedal of the vehicle.

One of the objects of the present invention is to provide a booster device which is operatively coupled with a standard master cylinder to form a single compact unit for convenient installation in the mountings of said standard master cylinder.

Another object of the present invention is to provide a booster device operatively coupled with a master cylinder wherein the output of said master cylinder serves as a signal to regulate the input of said booster device.

Another object of the present invention is to provide a booster device operatively coupled with a master cylinder which permits the use of separate and incompatible pressure fluids in the power system and the braking system, respectively.

Still another object of the present invention is to provide novel means for retaining a piston in a bore against displacement.

These and other objects and advantageous features will become apparent hereinafter.

Briefly, the invention is embodied in a booster device operatively coupled with pressure generating means in a power brake system. Force transmitting means interconnect valve means of the booster device and thrust means for the pressure generating means to predeterminately proportion an applied force therebetween. The valve means control the application of fluid pressure of a source to a motor device in said booster device which is operatively connected to assist said thrust means to actuate said pressure generating means. The invention also includes means to prevent displacement of a slidable member from a bore in a housing. The member and housing are provided with bayonet extensions to limit relative axial movement therebetween, and actuating means which are cooperatively received by the member extension are provided to limit relative rotational movement between the member and housing.

The invention also consists in the parts and in the arrangements and combinations of parts hereinafter described and claimed. In the accompanying drawings which form a part of this specification and wherein like numerals and like symbols refer to like parts wherever they occur:

FIG. 1 is a diagrammatic view of a power braking system showing a balanced, open center booster device therein, in cross-section, and operatively coupled with a master cylinder, and FIG. 2 is an enlarged partial elevational view of the booster device taken along the line 2—2 of FIG. 1.

Referring now in detail to FIGS. 1 and 2, a booster device 101 is shown in an open center power braking system. The booster device 101 is provided with a housing 102 having an integral mounting flange (not shown) fixedly attached by suitable means to a similar mounting flange (not shown) integrally provided on a housing 103 of a convention master cylinder or pressure generating means 104. The outlet port of the master cylinder 104 is connected to wheel cylinders 105 of wheel brake assemblies 106 by a conduit 107 which branches at 108. The pressure side of pumping means 109 is connected to the inlet port of the booster device 101 by a conduit 110, and the suction side of said pumping means is connected to the outlet port of said booster device by a conduit 111 which has a reservoir 112 interposed therein. A check valve 113 is shown interposed in a conduit 114 which is shunted around pumping means 109 to limit the maximum fluid pressure attainable; however, said check valve could be an integral part of said pumping means. To complete the power brake system, a conduit 115 has one end intersecting the conduit 107 while the other end thereof connects with the reaction port of the booster device 101. Of course, any number of balanced, open center servo motors could be serially connected in the system with the booster device 101, but for purposes of disclosure, only the booster device 101 is shown.

The booster device housing 102 is provided with an upper bore 116 axially interposed between counterbores 117 and 118, said upper bore being provided with spaced grooves 119 and 120 forming a land 121 therebetween near the mid-portion of said upper bore. An aligned check valve bore and counterbore 122 and 123 are spaced vertically below the bore 116, and a portion of check valve counterbore 123 also serves as an outlet port 123a to receive the conduit 111, as previously mentioned. A lower bore 124 is spaced still lower in the housing 102 in axial alignment with a lower intermediate bore 125 and counterbore 126, said counterbore having a breather or drain port 127 near the mid-portion thereof. An angularly disposed passage consisting of passage portions 128a and 128b provides pressure fluid communication between the lower intermediate bore 125, the check valve counterbore 123, and the upper bore 116, and one end of the passage portion 128b intersects said lower intermediate bore 125 near the left end thereof and the opposite end of the passage portion 128a intersects the upper bore groove 120. Another passage 129 intersects the right end of the lower intermediate bore 125 and extends upwardly therefrom intersecting the mid-portion of the check valve bore 122 and terminating in the upper bore groove 119. An inlet port 130 which receives the conduit 110, as previously mentioned, connects with the upper bore groove 119.

A fitting 131 is threadedly received in the counterbore 117 and is provided with an axial bore 132 and aligned stepped passages 133, and a portion of said passages 133 also serve as a reaction port 133a to receive the conduit 115, as previously mentioned. A sealing cup 134 is biased into abutting engagement with a piston 135 which is slidably received in the fitting bore 132 by the compressive force of a spring 136 interposed between said sealing cup and a shoulder formed by the juncture of said fitting bore and the passages 133. A piston rod 137 integrally formed with the piston 135 is pivotally received in a recess 138 in the left end of a balanced throttling valve 139 which is slidably received in the bore 116. The bore 116 carries an O-ring 140 adjacent the left end thereof for sealable engagement with the throttling rod 139, and another O-ring 141 is carried by said throttling valve for sealable engagement with the sidewall of said upper bore near the right end thereof. Consequently, the counterbores 117 and 118 are sealed from the bore 116 at all times. The throttling valve 139 is also provided with a reduced portion 142 having a throttling shoulder 142a which is normally biased from the upper bore land 121 allowing unrestricted pressure fluid flow therebetween from the inlet port 130 to the outlet port 123a via the upper bore 116, the passage 128a, and the check valve counterbore 123. The right end of the throttling valve 139 protrudes coaxially into the counterbore 118 and is fixedly received by suitable means, such as a press fit, in a recess 143 provided in a reduced portion 144 of a control member 145 which is slidably received in said counterbore. The compressive force of a spring 146, which is interposed between the control member 145 and the shoulder formed by the juncture of the bore 116 and counterbore 118, biases said control member and parts associated therewith rightwardly into abutting engagement with piston stop and retaining means 147.

The piston stop and retaining means 147 comprises upper and lower bayonet extensions 148 and 149 provided on the housing 102 and having grooves 150 and 151, respectively, in the inner surface of said extensions. The control member 145 is also provided with a bayonet extenson 152 which is slidably received by and normally alignable with the housing extensions 148 and 149, and said control member extension is provided with upper and lower projections 153 and 154 which are slidably received in the grooves 150 and 151, respectively. The projections 153 and 154 are movable into abutment with the end walls of the grooves 150 and 151 thereby limiting the movement of and preventing axial displacement of the control member 145 from the counterbore 118. The free or rightward end of the extension 152 is also provided with a pivot pin entrance slot 155 which intersects with a pivot pin retaining portion 156. The retaining portion 156 is provided with a diameter greater than the width of the entrance slot 155, and said entrance slot and pin retaining portion cooperatively receive a yoke linkage 157, to be discussed later.

A power push rod 158 is slidably received in the lower bore 124, and one end of said push rod extends exteriorly of the housing 102 while the other end thereof extends coaxially through the lower intermediate bore 125 into the lower counterbore 126. The power push rod 158 is sealably engaged by an O-ring 159 carried in the lower bore 124 and also by a dust seal assembly 160 fixedly positioned in a lower bore end recess 161. A breather port 162 is provided between the O-ring 159 and the dust seal assembly 160 to prevent expulsion of said dust seal assembly in the event of a pressure fluid leak past said O-ring. A seal carrying power piston or motor device 163 is slidably received in the lower intermediate bore 125 and is provided with a bore 164 which slidably receives the power push rod 158. The power piston 163 is normally abuttingly interposed between the right end wall of the lower intermediate bore 125 and a stop 165 carried on said power push rod.

In order to regulate and limit the maximum predetermined fluid pressure differential across the power piston 163, a check valve 166 is slidably positioned in the counterbore 123 and provided with an integral extension 167 which is slidably positioned in the bore 122 for guiding and damping purposes. The check valve 166 is normally biased into sealable engagement with a shoulder formed by the juncture of the bore 122 and counterbore 123 by the compressive force of a spring 168 interposed between said check valve 166 and a hexagonal shaped spring adjustment member 169 which is threadedly received in said counterbore. The hexagonal shaped member 169 allows continuous pressure fluid flow through the counterbore 123 while providing an adjustment to vary the compressive force of the spring 168. The compressive force of the spring 168 and the effective area of the seated check valve 166 determines the maximum fluid pressure differential attainable across the power piston 163.

The leftward end of the power piston 158 is slidably received in a seal carrying bore 170 of a wall member 171 which is abuttingly interposed between a stop ring 172 positioned in the counterbore 126 and a seal carrying shoulder formed by the juncture of the lower intermediate bore 125 and counterbore 126. A return spring assembly 173 is interposed between the master cylinder housing 103 and the stop ring 172 and is abuttingly engaged with the leftward end of the power push rod 158 about a deep axial recess 174 therein. A master cylinder push rod 175 has one end received in the recess 174 of the power push rod 158 while the other end thereof is received in another recess 176 provided in the right end of a secondary seal carrying, master cylinder piston 177 which is slidable in a bore 178 of the master cylinder housing 103. The master cylinder piston 177 is retained against displacement from the bore 178 by a stop plate 179, and a resilient boot 180 has one end carried by the master cylinder push rod 175 while the other end thereof is received in a cooperating groove 181 in the master cylinder housing 103 to prevent the entry of foreign particles into the master cylinder bore 178. The master cylinder housing 103 is also provided with a pressure fluid reservoir 182, and a compensating port 183 is interposed between said reservoir and the working portion of the master cylinder bore 178 while another passage 184 is similarly interposed between said reservoir and the non-working portion of said master cylinder bore for pressure fluid compensation purposes. The master cylinder bore 178 is also provided with an outlet port 185 through the left end wall thereof which receives the conduit 107, as previously mentioned. The outlet port 185 is controlled by an outlet check valve assembly 186 which is biased into sealable engagement with the left end wall of said master cylinder bore about said outlet port by the compressive force of a spring 187. The spring 187 is interposed between the check valve assembly 186 and a packing cup 188 which is seated against the left end of the piston 177 and sealably disposed in said master cylinder bore.

The yoke assembly 157 of the abovementioned control member stop and retaining means 147 is provided with spaced vertical members 189 and 190 which are interconnected by an upper pin 191 having a flat portion 192 thereon, an intermediate pin 193, and a lower pin 194 having a roller 195 rotatably received thereon. To assemble the yoke 157 with the control member extension 152, the flat portion 192 of the upper pin 191 is aligned with the entrance slot 155 and inserted into the pin retaining portion 156. By rotating the yoke 157 into a vertical position, as shown in the drawing, the upper pin 191 is pivotally engaged with the cooperating pin retaining portion 156. When the yoke 157 is in a vertical position, the diameter of the upper pin 191 is greater than the width of the entrance slot 155; therefore, the pin 191 is retained against displacement from the pin retaining portion 156. In this vertical position, the control member extension 152 and the lower extension 149 of the housing 102 are interposed between and juxtaposed with the spaced vertical members 189 and 190 of the yoke 157; therefore, said spaced vertical members positively retain the control member projections 153 and 154 in the grooves 150 and 151, against rotational displacement therefrom. The roller 195, carried by the lower pin 194, assumes a rolling engagement with the right end of the power push rod 158, as previously mentioned, and the intermediate pin 193 pivotally receives one end of a linkage 196 while the other end thereof is pivotally received by a conventional brake pedal 197 which, in turn, is pivotally anchored at 198. Of course, to disassemble the yoke 157 from the control member extension 152, said yoke is merely rotated to a horizontal position to realign the flat portion 192 of the upper pin 191 with the control member entrance slot 155 whereby said pin can be slidably displaced therefrom.

In the operation, pressure fluid is continuously circulated by pumping means 109 from the reservoir 112 through the conduit 110, the inlet port 130 of the booster device 101, the upper bore grooves and land 119, 120 and 121 into the passage portion 128a and check valve counterbore 123, and therefrom via the outlet port 123a and conduit 111 back to said reservoir. The fluid pressure maintained in the system under this condition is just great enough to overcome the flow resistance of said systems.

When the operator desires to effect deceleration and/or a complete stop, a manual force is applied to the brake pedal 197 and transmitted to the yoke 157 by the linkage 196. In turn, the yoke 157 transmits a predetermined portion of the manual force to the control member 145 and throttling valve 139 and a predetermined portion of said manual force to the power push rod 158. When the manual force is transmitted by the yoke 157 in this manner, the push rods 158 and 175 are moved leftwardly which, in turn, moves the master cylinder piston 177 in a fluid pressure developing direction in the bore 178; and, the control member 145 and throttling valve 142 are also moved leftwardly to position the throttling shoulder 142a closer to the cooperating land 121 thereby restricting or throttling the pressure fluid flow which establishes a pressure differential across said land. This pressure differential establishes a back or booster pressure in the passage 129 to move the power piston 163 leftwardly in the intermediate bore 125, and the abutting engagement between the power piston 163 and the stop 165 on the push rod 158 permits concert movement of said push rod with said power piston. In this manner, the actuation of the power piston 163 assists the portion of the manual force applied to the push rod 158 to move the master cylinder piston 177 in a fluid pressure generating direction in the bore 178. The generated fluid pressure in the bore 178 is applied via the master cylinder outlet port 185, and conduits 107 and 108 to actuate wheel cylinders 105 which in turn energizes the wheel brake assembly 106. Also, the generated fluid pressure in the bore 178 is applied via master cylinder outlet port 185, conduits 107 and 115, the reaction port 133, and the fitting bore 132 to move the reaction piston 135 and sealing cup 134 rightwardly in said fitting bore. In this manner, the actuation of the reaction piston 135 opposes the portion of the manual force applied to move the control member 145 and throttling valve 139 thereby regulating or controlling the throttling coaction between the throttling shoulder 142a and the land 121 and the magnitude of the pressure differential created by said throttling coaction. The force created by the generated fluid pressure acting on the effective area of the reaction piston is transmitted by the balanced throttling valve 142, the control member 145, the yoke 157, and the linkage 196 to the brake pedal 197 to afford the operator a reduced "feel" as to the extent of the braking application.

If the manual force is increased, the control member 145 and throttling valve 139 are moved to further throttle the pressure fluid flow thereby increasing the magnitude of the fluid pressure differential effective across the power piston 163. Thus the booster pressure is also increased to effect further concert movement of the power piston 163 and push rod 158 to further increase the generated fluid pressure in the master cylinder bore 178 and intensify the braking application, as previously described. The increased generated fluid pressure also moves the reaction piston 135 to further oppose movement of the throttling valve 139 thereby regulating the throttling coaction between the throttling shoulder 142a and the land 121, as previously described.

When the manual force is released by the operator, the generated fluid pressure in the fitting bore 132 moves the reaction piston 135 rightwardly which, when assisted by the compressive force of the spring 146, moves the control member 145 and throttling valve 139 rightwardly to their original positions. In this manner, the throttling rod shoulder reassumes its spaced position with the land 121 allowing unthrottled or unrestricted pressure fluid flow through the booster device 101 which consequently alleviates the fluid pressure differential effective across the power piston 163. When the pressure differential across the power piston 163 is alleviated, the generated fluid pressure also moves the master cylinder packing cup 188 and piston 177 rightwardly in the bore 178 which, when assisted by the compressive force of springs 187 and 173, moves the master cylinder push rod 175, the power push rod 158, and the power piston 163 to their original positions allowing de-energization of the wheel brake assemblies 106 and pressure fluid compensation in the master cylinder bore 178 through the ports 183 and 184.

The booster device 101 also affords the operator manual means for an emergency braking application in the event of power failure. In this instance, the manual force applied to the brake pedal 197 is transmitted through the linkage 196 to the yoke 157. The yoke 157 moves the control member 145 leftwardly, and the projections 153 and 154 on the control member extension 152 are moved into abutment with the end walls of the grooves 150 and 151 in the housing extensions 148 and 149. Further application of the manual force causes the yoke 157 to pivot on its upper pin 191 whereby the roller 195 on the lower pin 194 moves the power push rod 158 leftwardly independently of the power piston 163. The power push rod 158 slides through power piston bore 164 and moves the master cylinder push rod 175, piston 177, and packing cup 188 in a pressure generating direction in the bore 178 against the compressive forces of springs 173 and 187. In this manner, the generated fluid pressure actuates the wheel brake assemblies 106 and is effective to actuate the reaction piston 135, as previously described. When the manual force is released, the generated fluid pressure in the bore 178 moves the packing cup 188, the piston 177, and the push rods 158 and 175 to their original positions being assisted by the compressive forces of the springs 173 and 187 and thereby allowing de-energization of the wheel brake assemblies 106 and pressure fluid compensation in the master cylinder 104, as previously described. The compressisve force of the spring 146 also returns the control member 145 and parts associated therewith to their original positions upon the alleviation of the generated fluid pressure acting on the reaction piston 135.

From the foregoing, it is apparent that a manual braking system may readily be converted to a power braking system whereby the master cylinder on the vehicle can be operaively coupled with the booster device 101 instead of being discarded in lieu of a costly unitary servo motor. The booster device 101 can be employed in combination with a master cylinder and conveniently mounted in the master cylinder mountings thereby saving space and obviating any extensive pedal linkage alterations or rearrangements.

It is apparent that the output or generated fluid pressure of the master cylinder 104 serves as a signal to regulate the input or booster pressure of the booster device 101. The portion of the manual force applied to the control member 145 by the yoke 157 moves the throttling valve 142 and throttling shoulder 142a into flow restricting positions relative to the land 121 of the bore 116. The pressure differential or booster pressure created by flow throttling coaction between the land 121 and throttling shoulder 142a actuates the power piston 163, and the abutting engagement between the power piston 163 and push rod 158 permits said power piston to assist said push rod to move the master cylinder piston 177 in a fluid pressure generating direction in the bore 178. The generated fluid pressure is effective in the bore 132 to cause the reaction piston 135 to oppose the portion of the applied force effective on the throttling valve 142. As a result, the generated fluid pressure controls the flow throttling coaction between the land 121 and throttling shoulder 142a thus serving as a signal to regulate the booster pressure, the magnitude of which is dependent upon the degree of said flow throttling coaction. Also, the force of the generated fluid pressure acting on the effective area of the reaction piston 135 is transmitted to the brake pedal 197 via the throttling valve 142, the control member 145, the yoke 157, and the linkage 196.

It is also apparent that the booster device 101, when operatively coupled with the master cylinder 104, permits the use of separate and incompatible pressure fluids in the power system and the braking system. The use of separate pressure fluids is beneficial since the lubricating qualities of the pressure fluid in the braking system usually will not meet the standard of that employed in the power system; and in some instances, the pressure fluid in the power system deteriorates the seals employed in the braking system. None of the seals in contact with the pressure fluid of the master cylinder 104 is contacted by parts of the booster device 101 which are in contact with the pressure fluid of said booster device. Also any pressure fluid leaking from the bore 178 of the master cylinder 104 or the intermediate bore 125 of the booster device 101 will flow into the counterbore 126 and through the drain port 127.

It is also apparent that novel piston stop and retaining means 147 is provided for retaining a member in a bore against displacement. The sliding engagement of the projections 153 and 154 of the control member extension 152 in the cooperating grooves 150 and 151 of the housing extensions 148 and 149 not only limits the movement of the control member 145 but also obviates axial displacement of said control member from the counterbore 118 of the housing 102. Also, the normally aligned control member extension 152 and housing extensions 148 and 149 are interposed between the spaced vertical members 189 and 190 of the yoke 157 which thereby obviates rotational displacement of the control member 145. It should be noted that while being pivotally engaged with the pivot pin retaining portion 156 of the control member extension 152 the yoke 157 is normally retained against displacement therefrom by the predetermined misalignment between the flat 192 on the upper pin 191 and the pivot pin entrance slot 155 in the control member extension 152. Since the diameter of the pivot pin 191 is greater than the width of the slot 155, said pin is retained in the pin retaining portion 156 when the yoke 157 is in the assembled substantially vertical position. To disassemble, the yoke 157 is rotated so that the flat 192 of the upper pin 191 is aligned with the entrance slot 155 and can be displaced therethrough. With the yoke 157 disassembled from the control member 145, said control member can be removed from the counterbore 118 by rotating the projections 153 and 154 out of alignment with the housing grooves 150 and 151.

Thus it is apparent that there has been provided a novel booster device which fulfills all of the objects and advantages sought therefor. It is to be understood, however, that the foregoing description and accompanying drawings have been presented only by way of illustration and example and that many changes, modifications, and alterations in the present disclosure, which will be readily apparent to one skilled in the art, and which do not depart from the spirit and scope of the invention are deemed to be covered by the invention which is limited only by the claims which follow.

What I claim is:

1. A fluid pressure system for brakes and the like comprising a master cylinder, means for generating pressure in said master cylinder including a master cylinder piston and rod assembly, chamber means surrounding a portion of the master cylinder piston and rod assembly, a power piston slidably mounted on said assembly in said chamber means, a valve housing having a valve chamber therein and a communicating throttling passage, means including pumping means for continuously flowing pressure fluid through said throttling passage, a reaction port in said valve chamber connected to the master cylinder and responsive to the pressure therein, a first passage connecting the valve chamber on one side of the throttling passage to the chamber means on one side of the power piston, a second passage connecting the valve chamber on the opposite side of the throttling passage to the chamber means on the other side of the power piston, relief valve means connected between said first and second passages to limit the pressure differential therebetween, operator actuated thrust means operatively connected to the master cylinder piston and rod assembly and to the valve means, said thrust means including means to predeterminately proportion a motive force applied thereto between the valve means and said assembly, said valve means moving in response to the distributed portion of the motive source applied thereto to throttle the flow of pressure fluid from the pumping means through said throttling passage, cooperating abutment means on said power piston and on said master cylinder piston and rod assembly, said last named means being engageable for movement of the associated members in concert in response to the throttling coaction between said valve means and said throttling passage to assist that portion of the motive force applied to the master cylinder piston and rod assembly, the throttling effect produced by movement of said valve means in response to the motive force being opposed by the pressure of the master cylinder applied to the reaction port.

2. In a fluid pressure system having pressure generating means and pumping means, the improvement of providing booster means for said pressure generating means comprising a housing having a bore and a valve chamber therein, a throttling passage in said valve chamber, means including said pumping means for continuously flowing pressure fluid through said throttling passage, a reaction port in said valve chamber connected to the output of said pressure generating means, a piston slidable in said bore, thrust means slidably engageable with said piston in said bore and operatively connected to the pressure generating means, said thrust means and said piston having cooperating engageable abutment means thereon for movement in concert in one direction of movement thereof, passage means including said throttling passage for connecting said bore on opposite sides of the piston across the throttling passage, valve means slidable in said valve chamber, actuator means interconnecting said valve means and thrust means, said actuator means including means for predeterminately proportioning a motive force applied thereto between the valve means and the thrust means, said valve means being movable in response to the distributed proportion of the motive force applied thereto to throttle the flow from the pumping means through the throttling passage, said thrust means and piston moving in concert in response to the throttling coaction between the valve means and the throttling passage to assist the proportion of the motive force applied to the thrust means, the output of the pressure generating means producing a reaction force which operates against the valve means in a direction to oppose substantially only that proportion of the motive force applied to the valve means, and relief valve means connected across the piston to limit the pressure differential thereacross.

3. In a fluid pressure system having pressure generating means and pumping means; the improvement of providing a booster device for said pressure generating means comprising a housing having a bore, a valve chamber, and a reaction chamber therein, inlet and outlet ports connected with said pumping means for the continuous flow of pressure fluid through said valve chamber, a reaction port in said reaction chamber connected to the output of said pressure generating means, a piston slidable in said bore and defining expansible chambers in said bore adjacent to opposite faces thereof, thrust means for said pressure generating means extending through said expansible chambers and slidably engageable with said piston, cooperating abutment means on said piston and thrust means engageable to produce movement in concert for one direction of movement of said piston, valve means slidable in said valve chamber and forming a throttling passage in combination therewith to accommodate said continuous flow, said valve means having one end extending into said reaction chamber and responding to the pressure produced in the output of said pressure generating means to oppose the movement thereof, passage means including said throttling passage connecting said bore and valve chamber across said piston, and actuating means interconnecting the other end of said valve means with said thrust means to predeterminately proportion a motive force applied thereto between the valve means and the thrust means whereby said valve means is movable to a flow throttling position in response to one portion of said motive force to establish a pressure differential across said piston, said piston being movable in concert with the thrust means in response to said pressure differential in a direction to assist the other portion of said motive force applied to said thrust means by the actuating means to further increase the output of said pressure generating means, the output of said pressure generating means producing a reaction force which operates substantially only in opposition to the proportion of the motive force applied to the valve means.

4. In a fluid pressure system having pressure generating means and pumping means; the improvement in providing a booster device operatively connected with said pressure generating means comprising a housing having aligned reaction and valve chambers therein, a bore in said housing vertically spaced from said chambers, inlet and outlet ports in said valve chamber connected with said pumping means for the continuous flow of pressure fluid through said valve chamber, a land integrally formed in said valve chamber between said inlet and outlet ports, a piston slidable in said bore forming expansible chambers adjacent the opposed faces thereof, a first passage connecting with said valve chamber on one side of said land and communicating said inlet port with one of said expansible chambers, a second passage connecting with said valve chamber on the other side of said land and communicating said outlet port with the other of said expansible chambers, a bore in said piston, thrust means slidable in the bore of said piston, said thrust means having one end operatively connected to actuate said pressure generating means and the other end extending exteriorly of said housing, abutment means on said thrust means to effect concert movement of said thrust means and piston in one direction of movement of said piston, a throttling valve slidable in said valve chamber, said throttling valve having one end extending into said reaction chamber and the other end extending exteriorly of said housing, linkage means interconnecting the ends of said throttling valve and thrust means exteriorly of said housing to predeterminately proportion a motive force applied thereto, said throttling valve being movable in response to a portion of said motive force applied thereto to effect flow throttling coaction with said land and establish a pressure differential across said piston, said piston and thrust means being movable in concert in response to said pressure differential to assist a portion of said motive force applied to said thrust means to actuate said pressure generating means, and means to control the degree of said throttling coaction including a reaction port in said reaction chamber connected to the output of said pressure generating means, piston means slidable in said reaction chamber and normally biased into abutment with the end of said throttling valve in said reaction chamber, said piston means responding to the output pressure of said pressure generating means to oppose movement of said throttling means produced by the motive force.

References Cited in the file of this patent

UNITED STATES PATENTS

| | | |
|---|---|---|
| 232,577 | Walling | Sept. 21, 1880 |
| 2,130,799 | Hofstetter | Sept. 20, 1938 |
| 2,569,028 | Stryker | Sept. 25, 1951 |
| 2,575,964 | MacLean | Nov. 20, 1951 |
| 2,603,065 | Sarto | July 15, 1952 |
| 2,680,350 | Sprague et al. | June 8, 1954 |
| 2,685,172 | Price | Aug. 3, 1954 |
| 2,808,705 | Ingres | Oct. 8, 1957 |
| 2,844,941 | Ayers | July 29, 1958 |
| 2,878,647 | Schultz | Mar. 24, 1959 |
| 2,913,877 | Stelzer | Nov. 24, 1959 |
| 2,915,047 | Bradbury | Dec. 1, 1959 |
| 2,925,805 | Schultz | Feb. 23, 1960 |

FOREIGN PATENTS

| | | |
|---|---|---|
| 514,917 | Great Britain | Nov. 21, 1939 |